United States Patent [19]
Tanaka et al.

[11] Patent Number: 5,671,305
[45] Date of Patent: Sep. 23, 1997

[54] OPTICAL BRANCHING AND COUPLING DEVICE USING AN ASPHERICAL LENS

[75] Inventors: Haruo Tanaka; Naotaro Nakata, both of Kyoto, Japan

[73] Assignee: Rohm Co., Ltd., Kyoto, Japan

[21] Appl. No.: 400,514

[22] Filed: Mar. 7, 1995

Related U.S. Application Data

[63] Continuation of Ser. No. 120,430, Sep. 14, 1993, abandoned.

[30] Foreign Application Priority Data

Sep. 22, 1992 [JP] Japan ..................... 4-253178

[51] Int. Cl.⁶ ............................................. G02B 6/32
[52] U.S. Cl. ......................................................... 385/33
[58] Field of Search ........................... 385/31, 33, 39, 385/43, 74

[56] References Cited

U.S. PATENT DOCUMENTS

| | | | |
|---|---|---|---|
| 4,326,771 | 4/1982 | Henry et al. | 385/33 |
| 4,423,922 | 1/1984 | Porter | 385/44 |
| 4,564,260 | 1/1986 | Dirmeyer et al. | 385/44 |
| 4,753,508 | 6/1988 | Meuleman | 385/74 |
| 5,050,953 | 9/1991 | Anderson et al. | 385/33 X |
| 5,255,333 | 10/1993 | Althaus et al. | 385/33 |

FOREIGN PATENT DOCUMENTS

| | | | |
|---|---|---|---|
| 0042161 | 4/1979 | Japan | 385/33 |
| 57-78010 | 5/1982 | Japan. | |

*Primary Examiner*—Akm E. Ullah
*Attorney, Agent, or Firm*—Nikaido Marmelstein Murray & Oram LLP

[57] ABSTRACT

Disclosed is an optical branching and coupling device of high quality which is prevented from malfunction, corrosion and deterioration due to condensation on optical components incorporated therein by virtue of perfect sealing. The optical branching and coupling device including a housing provided with an aperture, optical instruments, associated with the housing, for branching, coupling, transmitting and receiving optical information input to the device, and an aspherical lens inserted into the aperture and fixed thereto by hermetic sealing with a glass material, the aspherical lens being adapted to connect at an end face thereof with at least one optical fiber.

9 Claims, 3 Drawing Sheets

OPTICAL BRANCHING AND COUPLING DEVICE USING AN ASPHERICAL LENS

This application is a continuation of application Ser. No. 08/120,430 filed Sep. 14, 1993 now abandoned.

FIELD OF THE INVENTION

The present invention relates to optical branching and coupling devices. More particularly, it relates to an optical branching and coupling device adapted to branch optical input signals of at least two different wavelengths fed from an optical fiber into a plurality of optical output signals of individual wavelengths transmitted a plurality of optical waveguides and to couple transmit signals with an optical fiber. Such an optical coupling is used in optical communications, in particular, at a distribution point of an optical communication customers' system.

BACKGROUND OF THE INVENTION

In coupling an optical fiber with an optical branching and coupling device (hereinafter referred to as "coupler" simply), a portion in which the optical fiber is inserted needs to have a very high sealing property so as to prevent malfunction of the coupler and corrosion or deterioration of each optical component due to penetration of moisture into the package of the coupler.

In a coupler of the conventional type as shown in FIG. 4, a bush 53 is fixed to an aperture 52 provided in a wall of a metal package housing 51 by soldering or welding. After inserting an optical fiber F into the bush 53, the space between the internal face of the bush 53 and the optical fiber F is filled with solder or adhesive 54 thereby to fix the optical fiber and seal the fixed portion. Numeral 55 denotes a coating material for the optical fiber F, and numeral 56 a rubber cover for protecting an exposed portion of the optical fiber which is uncoated with the coating material 55.

However, it is very difficult for such coupling to conform to a criterion which has been recently established and is usually required in a strict helium leak test. In fact, penetration of moisture into a package housing cannot be prevented completely. Further, a fairly high skill is needed for assembling operations including the aforesaid soldering or the injection of adhesive. This leads to greatly-increased production costs and instable quality of products.

In view of such problems, there has been proposed a coupling structure with a lens, as shown in FIG. 5 (refer to Japanese Unexamined Patent Publication No. 78010/1982). In this coupling structure, an aspherical lens 64 of bullet-like shape which is attached with a metal sleeve 63 having different diameters is inserted into an aperture 62 provided in a wall of a metal package housing 61. The small diameter portion of the metal sleeve 63 is fixed at its inner periphery to a metallized peripheral surface of the aspherical lens 64 with a soldering metal, while the large diameter portion thereof is secured at its outer periphery to the circumferential surface of the aperture 62 also with a soldering metal. An optical fiber F is secured to the rear face of the aspherical lens 64.

With the above structure, however, the aspherical lens of glass must be formed at its cylindrical portion with a metallization layer circumferentially. To this end, the aspherical lens needs to be subjected to sputtering in a vacuum chamber. This is achieved by a batch system which necessitates a large-sized apparatus and a long time for exhaustion. In addition, since the aspherical lens is fixed by means of the metal sleeve of different diameters, it tends to become eccentric, which results in a cause of performance degradation.

Further, the soldering uses an expensive soldering metal of the composition: Au (80%) and Sn (20%), and requires time and producing steps, thus resulting in a product of high price.

SUMMARY OF THE INVENTION

The present invention has been attained to overcome the foregoing problems. It is, therefore, an object of the present invention to provide a high-quality coupler wherein the portion coupled with an optical fiber can be perfectly sealed from the outside thereby preventing malfunction, corrosion and performance degradation due to condensation on optical components.

According to the present invention, there is provided an optical branching and coupling device comprising a housing provided with an aperture, optical instruments, associated with the housing, for branching, coupling, transmitting and receiving optical information input to the device, and an aspherical lens inserted into the aperture and fixed thereto by hermetic sealing with a glass material, the aspherical lens being adapted to connect at an end face thereof with at least one optical fiber.

It is preferable that the aspherical lens has a collar portion formed continuously and integrally with a lens portion thereof, and that the collar portion is fixed to the periphery of the aperture of the housing by hermetic sealing with a glass material of a low melting point.

It is preferable that the glass material is made of a low melting-point glass.

It is preferable that the low melting-point glass is composed of PbO.

It is preferable that the optical fiber is connected to the end face of the aspherical lens by disposing a mounting flange, with which the optical fiber is fixed, on the housing.

It is preferable that the optical fiber is connected to the end face of the aspherical lens by adhesive.

It is preferable that the aspherical lens has a high refractive index and a thermal expansion coefficient which is close to that of a metal material of the housing.

With the present invention, in the portion coupled with the optical fiber the clearance between the periphery of the aperture and the aspherical lens is uniformly hermetically sealed with the glass material. In addition there is no other portion to be sealed, and the sealing operation does not involve the operation of coupling the optical fiber. Hence, there is provided a perfectly-sealed coupler which can be easily assembled.

DETAILED DESCRIPTION

The present invention will now be described in detail with reference to the drawings.

Figure 1:
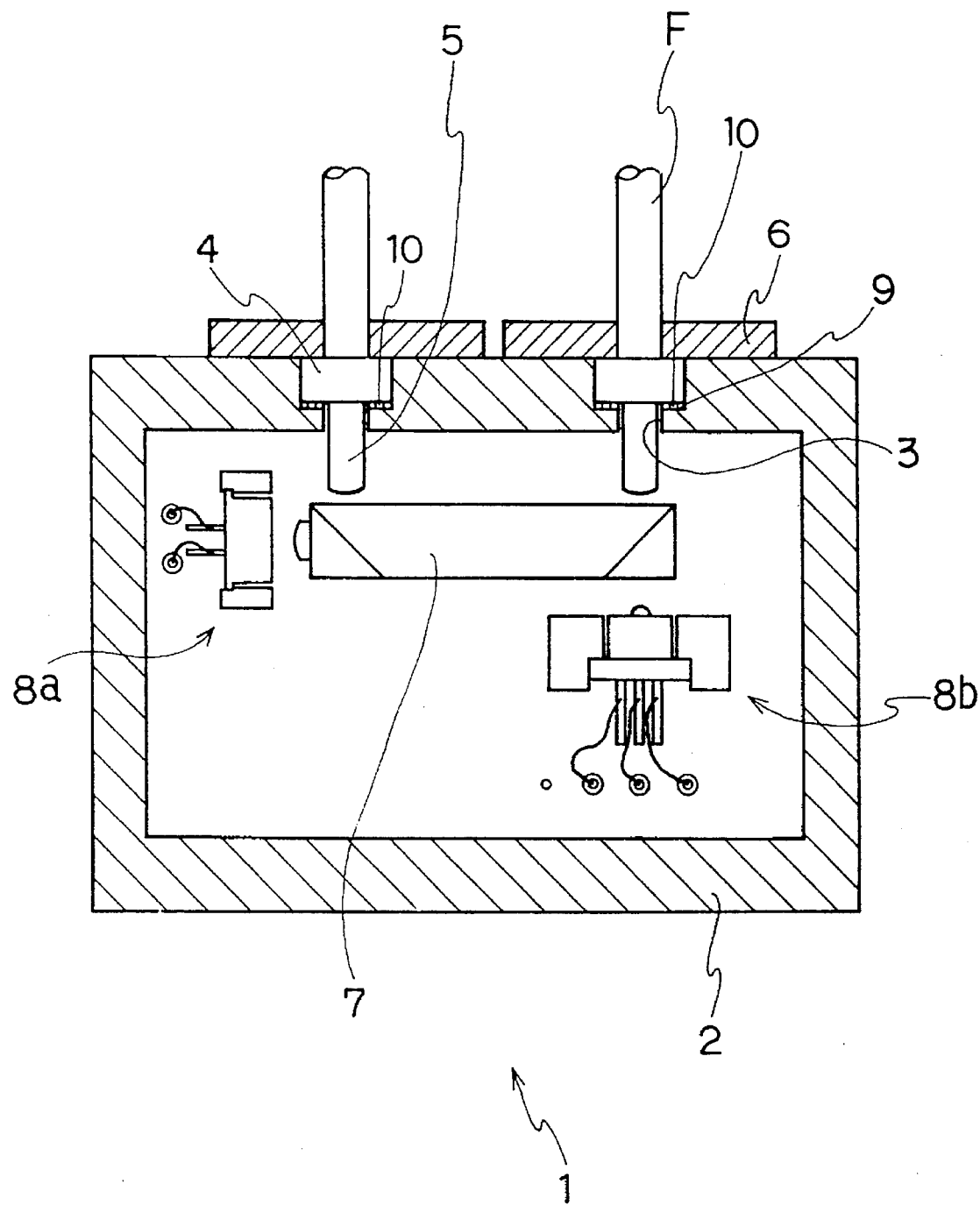
FIG. 1 is a schematic sectional view showing an embodiment of an optical branching and coupling device according to the present invention.

Referring to FIG. 1, numeral 1 denotes a coupler, and numeral 2 a package housing. The package housing 2 has at its wall an aperture 3 for coupling an optical fiber F. An aspherical lens 5 of bullet-like shape having a collar portion 4 is inserted into the aperture, and securely fixed to a spot-faced surface 9 of the package housing 2 by means of a low melting-point glass 10. The optical fiber F is secured to the rear end face (the upper face of the collar portion 4) of the aspherical lens 5 by means of a mounting flange 6. Within the package housing 2, there are provided a mirror block 7 for switching the course of an optical signal input from the optical fiber F or separating input light of different wavelengths into light having an individual wavelength, a photoelectric converter 8a composed of a photodiode or the like, and a photoconverter 8b for converting an electric signal into an optical signal.

In the present embodiment, the package housing 2 is formed from covar (Fe—Co—Ni alloy), iron (Fe) or the like, and Ni-plated for rust-proofing. Alternatively the package housing 2 may be formed from a Fe—Ni alloy, stainless steel or the like.

Figure 2:
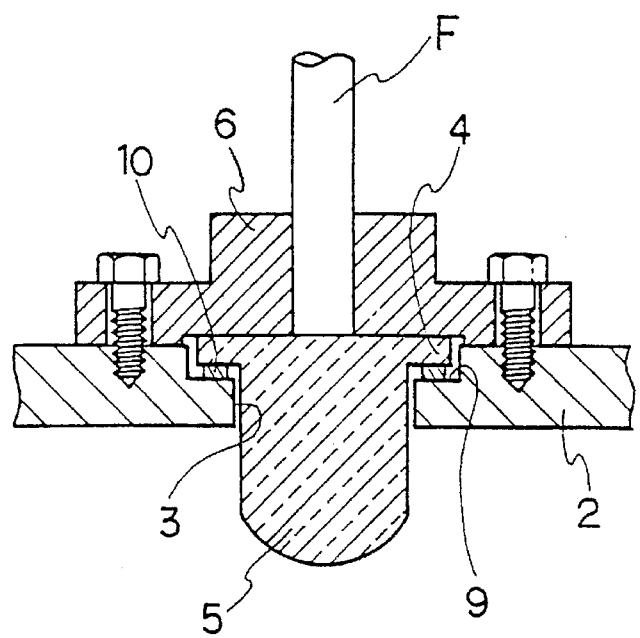
FIG. 2 is a sectional view showing an example of an optical-fiber-coupling portion of the optical branching and coupling device shown in FIG. 1.

As described above, the coupling portion where the aspherical lens is coupled with the package housing requires a high-sealing property. To meet this requirement, the present embodiment is arranged as shown in FIG. 2. That is, the package housing 2 has at its wall the aperture 3 having a diameter of about 2 mm and, therearound, a spot-faced surface 9 having a diameter of about 4 mm. On the spot-faced surface 9, there is disposed an annular seal member 10 of a low melting-point glass for providing hermetic sealing, which is interposed between the spot-faced surface 9 and the aspherical lens 5 inserted into the aperture 3. The aspherical lens 5 has, along its overall rear end circumference, the collar portion 4 formed integrally therewith and is of a substantially bullet-like shape. The collar portion 4 is fixed over its entire circumference to the spot-faced surface 9 with the seal member 10 thereby sealing the clearance between the two parts 4 and 9. The sealing portion of the aspherical lens may be a body portion of the bullet-like lens instead of the collar portion. In this case, the aspherical lens is bonded to the aperture by fusing the seal member.

The aspherical lens is employed because it has no spherical aberration and thereby offers an improved optical coupling efficiency between optical fibers F. In the present embodiment, the aspherical lens 5 is formed from BAF52 (a product of SCHOTT corporation) by press molding. Although the material therefor is not particularly limited to the BAF52, it preferably has a high refractive index (, for example more than 1.58), transition point of a glass is higher than that of the low melting-point glass by about 80° C., for example, about 500° C. or above, and a high thermal expansion coefficient (essentially equal or close to that of a metal). A lens of a high refractive index is large in both convergence constant and divergence constant, hence, can be made compact, and assures an easy focusing even with a relatively low asphericity. A lens of a high glass transition point is hard to be distorted when the seal member (low melting-point glass) 10 is melted for sealing. However, when the glass transition point thereof is too high, the material is hard to be formed into an aspheric lens by press molding. Therefore, it is preferable to use a glass having a glass transition point of about 500° C. to about 600° C. for the aspheric lens 5. A lens of a high thermal expansion coefficient which is close to that of a metal is prevented from inconveniences such as cracking and seal exfoliation (or separation) which may result due to residual stress or the like during and after fixation to the metal package housing 2.

As the low melting-point glass for the seal member 10, a PbO glass is preferably used. In the case of the PbO glass, transition point thereof is about 430° C., which is rather lower than that of the aspherical lens of aforementioned BaF52 (about 550° C.).

In forming the coupling portion for the optical fiber F with use of the aforementioned materials, the seal member 10 is placed on the spot-faced surface 9 first, and then the aspherical lens 5 is inserted into the aperture 3. The collar portion 4 of the aspherical lens 5 and the spot-faced surface are heated at about 480° C. while pressing the aspherical lens 5 so as to compress the seal member 10 therebetween using a carbon jig (not shown), and then gradually cooled. Thus, the seal member 10 is melted without deforming the aspherical lens 5, and the collar portion 4 is bonded to the spot-faced surface 9 by fusing the seal member, thereby perfectly sealing the clearance therebetween. Finally, the mounting flange 6 into which the optical fiber is pressure-fitted and fixed is mounted on the package housing 2 with a belt or the like in such a manner as to press the aspherical lens 5.

Figure 3:
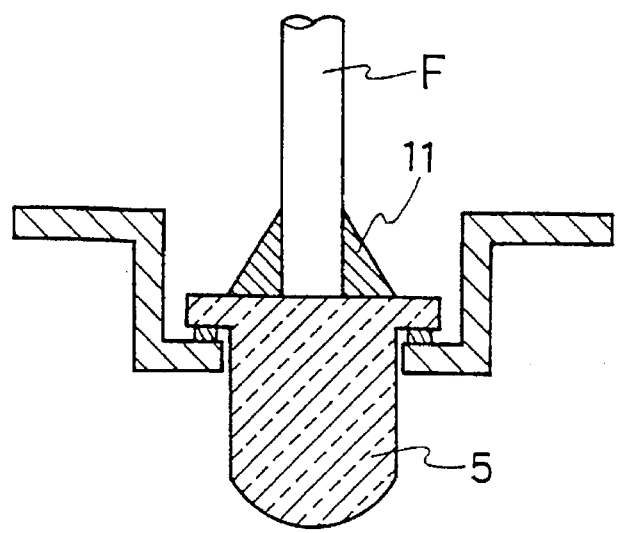
FIG. 3 is a sectional view showing another example of the optical-fiber-coupling portion of the optical branching and coupling device shown in FIG. 1.
Figure 4:
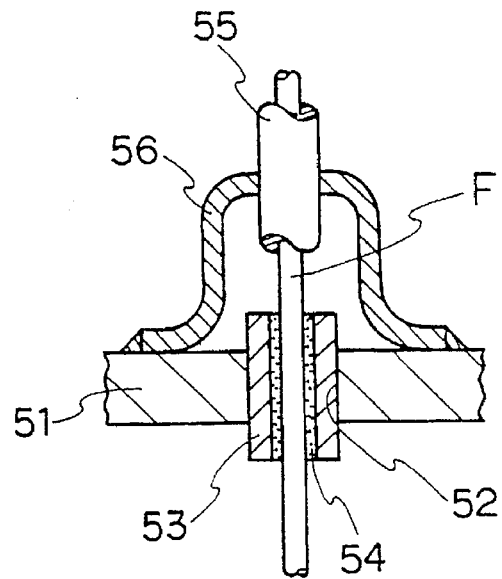
FIG. 4 is a sectional view showing an example of a conventional optical-fiber-coupling structure.
Figure 5:
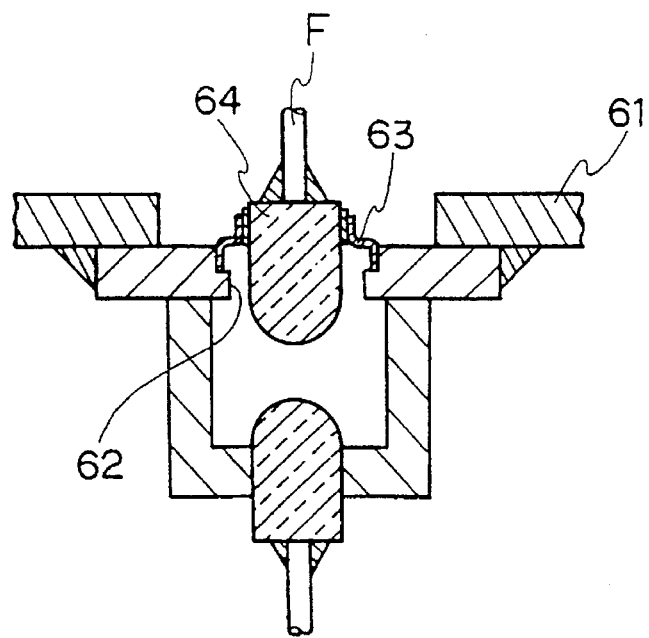
FIG. 5 is a sectional view showing another example of the conventional optical-fiber-coupling structure.

It should be noted that without using the mounting flange 6 the optical fiber F may be fixed to the rear end of the aspherical lens 5 by a known bonding method using an adhesive 11 such as made of an epoxy resin, as shown in FIG. 3.

As described above, the sealing operation is easily and precisely achieved without involving the operation of coupling the optical fiber F with the aspherical lens.

Consequently the sealed portion clears a fairly strict criterion of $1 \times 10^{-8}$ atm·cc/sec, in a helium leak test and, hence, reaches a reliability level of typical hermetically-sealed electronic components.

As has been described, by perfectly sealing an optical-fiber-coupling portion from the outside, there can be provided a high-quality, high-performance optical coupler which is prevented from malfunction, corrosion and deterioration due to condensation on optical components therein.

Further, the coupler incorporating in its package housing a mirror block, photoelectric converter and the like is hermetically sealed with an aspherical lens. Hence, if only the end of an optical fiber is placed on the end face of the aspherical lens and fixed to the package housing with a mounting flange or the like, a terminal device belong to a subscriber or transmitting station can readily be connected to an optical fiber communication network. Therefore, the optical coupler according to the present invention will greatly contribute to a further development of an optical fiber communication network.

Though several embodiments of the present invention are described above, it is to be understood that the present invention is not limited only to the abovementioned, various changes and modifications may be made in the invention without departing from the spirit and scope thereof.

What is claimed is:

1. An optical branching and coupling device comprising:

a housing provided with an aperture;

optical instruments, associated with the housing, for branching, coupling, transmitting and receiving optical information input to the device;

an aspherical lens having a rear end formed with a collar portion which is formed continuously and integrally with a remaining portion of said aspherical lens, said collar portion being wider in width than said remaining portion of said aspherical lens, said aspherical lens is inserted into the aperture and said collar portion being fixed to a portion of said aperture by hermetic sealing with a glass material;

at least one optical fiber placed on an end face of the collar portion; and a mirror block, provided within said housing, for switching a course of an optical signal input from said at least one optical fiber or for separating input light of different wavelengths into light having an individual wavelength.

2. The optical branching and coupling device of claim 1, wherein said collar portion is fixed to a periphery of the aperture by hermetic sealing with a glass material of a low melting point.

3. The optical branching and coupling device of claim 1, wherein said glass material is made of a low melting-point glass.

4. The optical branching and coupling device of claim 3, wherein said low melting-point glass is composed of PbO.

5. The optical branching and coupling device of claim 1, wherein said optical fiber is connected to said end face of said aspherical lens by disposing a mounting flange, with which said optical fiber is fixed, on said housing.

6. The optical branching and coupling device of claim 1, wherein said optical fiber is connected to said end face of said aspherical lens by adhesive.

7. The optical branching and coupling device of claim 1, wherein said aspherical lens has a high refractive index and a thermal expansion coefficient which is close to that of a metal material of said housing.

8. The optical branching and coupling device of claim 2, where said aperture has two different widths and said collar of the aspherical lens fits inside the one width while the lens fits in the other width of the aperture.

9. The optical branching and coupling device of claim 5, where said mounting flange, holding the optical fiber, is attached to the housing surrounding and covering said aperture of the housing.

\* \* \* \* \*